United States Patent
Tsao et al.

(10) Patent No.: US 9,073,648 B2
(45) Date of Patent: Jul. 7, 2015

(54) STAR TRACKER RATE ESTIMATION WITH KALMAN FILTER ENHANCEMENT

(71) Applicant: The Boeing Company, Chicago, IL (US)

(72) Inventors: Tung-Ching Tsao, Torrance, CA (US); Richard Y. Chiang, Torrance, CA (US)

(73) Assignee: The Boeing Company, Chicago, IL (US)

( * ) Notice: Subject to any disclaimer, the term of this patent is extended or adjusted under 35 U.S.C. 154(b) by 103 days.

(21) Appl. No.: 14/181,504

(22) Filed: Feb. 14, 2014

(65) Prior Publication Data

US 2014/0236401 A1 Aug. 21, 2014

Related U.S. Application Data

(60) Provisional application No. 61/765,586, filed on Feb. 15, 2013.

(51) Int. Cl.
| | |
|---|---|
| *G01C 21/02* | (2006.01) |
| *B64G 1/36* | (2006.01) |
| *B64G 3/00* | (2006.01) |
| *G01P 21/00* | (2006.01) |

(52) U.S. Cl.
CPC .. *B64G 1/36* (2013.01); *B64G 3/00* (2013.01); *G01P 21/00* (2013.01); *G01C 21/02* (2013.01)

(58) Field of Classification Search
None
See application file for complete search history.

(56) References Cited

U.S. PATENT DOCUMENTS

| | | | | |
|---|---|---|---|---|
| 5,108,050 | A * | 4/1992 | Maute | 244/171 |
| 5,259,577 | A * | 11/1993 | Achkar et al. | 244/164 |
| 5,556,058 | A * | 9/1996 | Bender | 244/171 |
| 5,822,515 | A * | 10/1998 | Baylocq | 714/56 |
| 6,020,956 | A * | 2/2000 | Herman et al. | 356/139.01 |
| 6,047,226 | A * | 4/2000 | Wu et al. | 701/13 |
| 6,053,455 | A * | 4/2000 | Price et al. | 244/169 |
| 6,061,611 | A * | 5/2000 | Whitmore | 701/4 |
| 6,108,594 | A * | 8/2000 | Didinsky et al. | 701/13 |
| 6,145,790 | A * | 11/2000 | Didinsky et al. | 244/164 |
| 6,266,616 | B1 * | 7/2001 | Needelman | 701/513 |
| 6,285,927 | B1 * | 9/2001 | Li et al. | 701/13 |
| 6,285,928 | B1 * | 9/2001 | Tilley et al. | 701/13 |
| 6,356,815 | B1 * | 3/2002 | Wu et al. | 701/13 |
| 6,454,217 | B1 * | 9/2002 | Rodden et al. | 244/164 |
| 6,470,270 | B1 | 10/2002 | Needelman et al. | |
| 6,512,979 | B1 | 1/2003 | Needelman et al. | |
| 6,600,976 | B1 * | 7/2003 | Goodzeit et al. | 701/13 |
| 6,681,159 | B2 * | 1/2004 | Li et al. | 701/13 |
| 6,691,033 | B1 * | 2/2004 | Li et al. | 701/513 |

(Continued)

OTHER PUBLICATIONS

Crassidis, "Angular Velocity Determination Directly from Star Tracker Measurements" AIAA Journal of Guidance, Control, and Dynamics, vol. 25, No. 6, Nov.-Dec. 2002, pp. 1165-1168.

(Continued)

*Primary Examiner* — Jonathan M Dager

(74) *Attorney, Agent, or Firm* — Ostrager Chong Flaherty & Broitman P.C.

(57) ABSTRACT

An attitude estimator that uses star tracker measurements and enhanced Kalman filtering, with or without attitude data, to provide three-axis rate estimates. The enhanced Kalman filtering comprises taking an average of forward and rearward propagations of the Kalman filter states and the error covariances. The star tracker-based rate estimates can be used to control the attitude of a satellite or to calibrate a sensor, such as a gyroscope.

20 Claims, 6 Drawing Sheets

(56) References Cited

U.S. PATENT DOCUMENTS

| | | | |
|---|---|---|---|
| 6,695,263 B1* | 2/2004 | Goodzeit | 244/164 |
| 6,702,234 B1* | 3/2004 | Goodzeit | 244/164 |
| 6,732,977 B1* | 5/2004 | Goodzeit et al. | 244/164 |
| 7,246,775 B1* | 7/2007 | Goodzeit et al. | 244/164 |
| 7,410,130 B2 | 8/2008 | Wang et al. | |
| 7,487,016 B2 | 2/2009 | Fowell et al. | |
| 7,835,826 B1* | 11/2010 | Weigl et al. | 701/4 |
| 8,185,261 B2* | 5/2012 | Patera | 701/4 |
| 8,185,262 B2* | 5/2012 | Johnson | 701/4 |
| 8,265,804 B1 | 9/2012 | Uetrecht et al. | |
| 8,380,370 B2* | 2/2013 | Liu et al. | 701/13 |
| 8,543,266 B2* | 9/2013 | Li et al. | 701/13 |
| 2002/0004691 A1* | 1/2002 | Kinashi et al. | 701/4 |
| 2003/0009284 A1* | 1/2003 | Needelman et al. | 701/222 |
| 2003/0080255 A1* | 5/2003 | Li et al. | 244/158 R |
| 2004/0098178 A1* | 5/2004 | Brady et al. | 701/4 |
| 2004/0140400 A1* | 7/2004 | Goodzeit et al. | 244/164 |
| 2004/0144910 A1* | 7/2004 | Peck et al. | 250/206.2 |
| 2004/0148068 A1* | 7/2004 | Fowell et al. | 701/13 |
| 2005/0010337 A1* | 1/2005 | Li et al. | 701/4 |
| 2005/0027407 A1* | 2/2005 | Holt et al. | 701/4 |
| 2005/0060092 A1* | 3/2005 | Hablani | 701/213 |
| 2005/0071055 A1* | 3/2005 | Needelman et al. | 701/13 |
| 2005/0133670 A1* | 6/2005 | Wang et al. | 244/170 |
| 2005/0133671 A1* | 6/2005 | Wang et al. | 244/170 |
| 2006/0149474 A1* | 7/2006 | Needelman et al. | 701/222 |
| 2006/0186274 A1* | 8/2006 | Wang et al. | 244/158.4 |
| 2007/0023579 A1* | 2/2007 | Wang et al. | 244/158.6 |
| 2008/0046138 A1* | 2/2008 | Fowell et al. | 701/13 |
| 2010/0019092 A1* | 1/2010 | Liu et al. | 244/170 |
| 2010/0059631 A1* | 3/2010 | Wang et al. | 244/165 |
| 2010/0117894 A1* | 5/2010 | Velde et al. | 342/357.02 |
| 2011/0024571 A1* | 2/2011 | Tsao et al. | 244/171 |
| 2014/0229136 A1* | 8/2014 | Reth | 702/96 |

OTHER PUBLICATIONS

Singla et al., "Spacecraft Angular Rate Estimation Algorithms for Star Tracker-Based Attitude Determination", 13th AAS/AIAA Space Flight Mechanics Meeting, Ponce, Puerto Rico, Feb. 2003, AAS Paper # 03-191.

Liebe et al., "Toward a Stellar Gyroscope for Spacecraft Attitude Determination," J. of Guidance, Control and Dynamics, vol. 27, No. 1, Jan.-Feb., 2004.

Yu et al., "Derivation of Kalman Filtering and Smoothing Equations", Technical Report, Oct. 19, 2004.

\* cited by examiner

STAR TRACKER RATE ESTIMATION WITH KALMAN FILTER ENHANCEMENT

RELATED PATENT APPLICATION

This application claims the benefit, under Title 35, United States Code, §119(e), of U.S. Provisional Application No. 61/765,586 filed on Feb. 15, 2013, the disclosure of which is incorporated by reference herein in its entirety.

BACKGROUND

The subject matter disclosed herein is generally directed toward systems and methods for bringing a spacecraft to a desired attitude without using a gyroscope and, more particularly, toward systems and methods for estimating spacecraft angular rate information using star position measurements.

A spacecraft in order to perform its mission generally requires precise control of the orientation of the spacecraft payload relative to its target. A major challenge for vehicle designers is "pointing performance", that is, making sure that the payload, for example an antenna, is aimed at the right spot or target on the Earth or elsewhere. Pointing is often autonomous, meaning directed by onboard computers, as opposed to having a team on the ground constantly commanding the vehicle.

There are two major components affecting spacecraft autonomous pointing performance. One component is knowledge of attitude estimation called estimator. Attitude estimation is to know the satellite's orientation with respect to some reference frame. The other major component is attitude controller. The controller defines ways to stabilize the system, and correct the satellite's attitude based on the command attitude versus the estimated attitude from the attitude estimator Spacecraft attitude control system requires an on-board attitude determination subsystem and attitude controller. The logic of the attitude controller applies a torque command to the spacecraft to correct the error between a desired attitude and an estimated attitude. Spacecraft angular rate information is fed back for attitude control. In general, the body angular rate information is provided by three-axis gyros incorporated in inertial reference units (IRUs). A satellite typically includes at least two IRUs for redundancy in case one fails. The IRUs measure or determine the angular velocity about each of the three orthogonal axes. Angular velocity may be defined as the spin rate of the vehicle about each one of the three axes. Each IRU typically include three gyroscopes or simply gyros. Each gyro measures angular velocity about a different axis. Some IRUs are internally redundant, i.e., they include four gyros. To decrease the cost of a spacecraft, the number of gyros can be reduced, but this in turn may result in an increased risk of mission failure.

Due to limited resources or gyro failure, spacecraft attitude control systems can face drastic challenges in the area of system stability and fault autonomy. Various designs have been proposed to address satellite attitude control without a gyroscope. For example, the information needed to re-orient a disoriented spacecraft in three-dimensional space may be provided by a star tracker (comprising, e.g., imaging hardware and a high-speed computer processor).

It is known to use star trackers to determine spacecraft attitudes. But it is not common practice to use a star tracker to estimate the spacecraft rates in the absence of gyros. Estimated rates from star trackers can compensate for degraded mission performance in the presence of gyro failures or can be used as a reliable rate reference for sensor calibration.

Current star trackers use active pixel sensor-based chips and incorporate fast processors to produce derived rate measurements together with attitude information. But without proper rate estimate algorithms like the ones presented below, their rate estimates are highly unreliable.

A method for determining spacecraft angular velocity directly from star tracker measurements was disclosed by John L. Crassidis in a paper entitled "Angular Velocity Determination Directly from Star Tracker Measurements" AIAA Journal of Guidance, Control, and Dynamics, Vol. 25, No. 6, November-December 2002, pp. 1165-1168, and referenced hereinafter as Crassidis. Crassidis teaches a method for determining spacecraft angular velocity using a least-squares approach based only on knowledge of the star position vectors in the spacecraft body frame, which are obtained directly from the star tracker. Crassidis state the main advantage of his methodology is that it requires no information about the star reference vectors or the spacecraft attitude.

Singla et al. disclosed Kalman filtering algorithms for gyroless estimation of spacecraft body angular rates using a star tracker in a paper entitled "Spacecraft Angular Rate Estimation Algorithms for Star Tracker-Based Attitude Determination", 13th AAS/AIAA Space Flight Mechanics Meeting, Ponce, Puerto Rico, February 2003, AAS Paper #03-191, and referenced hereinafter as Singla. Singla disclosed two embodiments. In a first embodiment, body angular rates are estimated with the spacecraft attitude using a dynamical model of the spacecraft and star identification. A second embodiment is capable of estimating the body angular rates independent of spacecraft attitude. The second embodiment employs a rapid update rate of a star tracker camera and finite difference analysis of "image flow" trajectories of the measured star line-of-sight vectors in the star tracker coordinate system.

SUMMARY

The subject matter disclosed in detail below is directed to systems and methods for calculating a spacecraft rate estimate in the absence of a gyroscope. In some cases, a gyroscope on a satellite or other spacecraft may fail or become inoperative. In other cases, it may be desirable to not fly a gyroscope at all, which would reduce the cost of a satellite or other spacecraft by a minimum of about $3 to 4 million.

A typical Kalman filter averages a prediction of a system's state with a new measurement using a weighted average. The purpose of the weights is that values with better (i.e., smaller) estimated uncertainty are "trusted" more. The weights are calculated from the covariance, a measure of the estimated uncertainty of the prediction of the system's state. The result of the weighted average is a new state estimate that lies between the predicted and measured state when state is measurable, and has a better estimated uncertainty than either alone. Both states to be estimated and the estimation error covariances are "propagated" based on knowledge of state dynamics and "corrected" based on measurements by typical Kalman filter "prediction process" and "correction process" respectively. This process is repeated every time step. Propagation in a forward direction means that the measurement data is passed through the Kalman filter in the time sequence in which it is received; propagation in a rearward direction means that the same measurement data is passed through the same Kalman filter, but in the reverse order.

Various embodiments of systems and methods for estimating spacecraft body rates using a star tracker and enhanced Kalman filtering, with or without attitude data, are disclosed herein. The enhanced Kalman filtering comprises taking an average of forward and rearward propagations of the Kalman filter states and the error covariances. Computer simulations were run to compare the enhanced Kalman filtering disclosed herein to forward Kalman filtering alone, backward Kalman filtering alone, and a smoothing algorithm that derives a posteriori estimates and covariances up to a time $t_m$ using forward Kalman filtering, derives a priori estimates and covariances back to time $t_m$ using backward Kalman filtering, and then combines both to get the final estimate and covariance at time $t_m$. Those computer simulations confirmed that the Kalman filter enhancement disclosed herein can reduce errors by a factor of 3 to 5. The star tracker-based rate estimates obtained using the enhanced Kalman filtering disclosed herein can be used to control the attitude of a satellite or to calibrate a sensor, such as a gyroscope.

One aspect of the subject matter disclosed in detail below is a method of estimating a three-axis attitude and rate of a spacecraft in a spacecraft body frame of reference, comprising: (a) measuring star vectors at a plurality of instants of time using a star tracker attached to a spacecraft; (b) calculating a respective spacecraft body frame-to-ECI frame quaternion for each instant of time based on information derived from the measured star vectors; (c) calculating spacecraft body rates based on the quaternions calculated in step (b); (d) forward Kalman filtering the calculated spacecraft body rates; (e) backward Kalman filtering the calculated spacecraft body rates; (f) averaging the results of steps (d) and (e) to produce average rate estimates; (g) selecting one of the average rate estimates, or calculating a rate estimate that is a function of two or more of the average rate estimates; and (h) calculating a three-axis attitude of the based on the rate estimate selected or calculated in step (g). The method may further comprise commanding a change in spacecraft attitude based on differences between a target three-axis attitude and the calculated three-axis attitude, and/or calculating changes in attitude based on the quaternions calculated in step (b).

In accordance with one embodiment, the method described in the preceding paragraph further comprises: identifying star vectors in an ECI frame corresponding to the measured star vectors; determining a first rotation matrix representing a mapping of a star tracker frame to the ECI frame; retrieving a second rotation matrix representing a mapping of a spacecraft body frame to the star tracker frame; and calculating a third rotation matrix representing a mapping of the spacecraft body frame to the ECI frame, wherein the information derived from the measured star vectors comprises the third rotation matrix.

Another aspect is a spacecraft comprising a body, a camera mounted to the body, and a computer system programmed to perform the following operations: (a) processing images of stars captured at successive instants of time by the camera to collect star vectors; (b) calculating a respective spacecraft body frame-to-ECI frame quaternion for each instant of time based on information derived from the star vectors; (c) calculating spacecraft body rates based on the quaternions calculated in operation (b); (d) forward Kalman filtering the calculated spacecraft body rates; (e) backward Kalman filtering the calculated spacecraft body rates; (f) averaging the results of operations (d) and (e) to produce average rate estimates; (g) selecting one of the average rate estimates, or calculating a rate estimate that is a function of two or more of the average rate estimates; and (h) calculating a three-axis attitude of the spacecraft based on the rate estimate selected or calculated in operation (g). The computer system may be further programmed to command a change in spacecraft attitude based on differences between a target three-axis attitude and the calculated three-axis attitude. For example, the spacecraft may further comprise means for producing torques that change the attitude of the spacecraft in response to a command from the computer system.

A further aspect of the subject matter disclosed herein is a method of estimating a three-axis attitude and rate of a spacecraft in a spacecraft body frame of reference, comprising: (a) measuring star vectors on an imaging plane at a plurality of instants of time using a star tracker attached to a spacecraft; (b) calculating respective spacecraft body rates for the instants of time based on the star vector measurements without using attitude information; (c) forward Kalman filtering the calculated spacecraft body rates; (d) backward Kalman filtering the calculated spacecraft body rates; (e) averaging the results of steps (c) and (d) to produce average rate estimates; (f) selecting one of the average rate estimates, or calculating a rate estimate that is a function of two or more of the average rate estimates; and (g) calculating a three-axis attitude of the spacecraft based on the rate estimate selected or calculated in step (f). This method may further comprise matching pairs of star vectors between sampled frames without identifying stars.

In accordance with one embodiment of the method described in the preceding paragraph, the star vector pair matching step comprises: (h) measuring the positions of star vectors in a first sampled-data frame; (i) predicting the positions of the same star vectors in a second sampled-data frame by rotating the measured star vectors at a rate equal to the rate estimate selected or calculated in step (f); (j) computing a detection threshold using a covariance matrix; (k) measuring the positions of star vectors in the second sampled-data frame; and (l) pairing the star vectors whose positions were measured in step (k) with the star vectors having predicted positions based on separation angles and the detection threshold computed in step (j).

Yet another aspect is a spacecraft comprising a body, a camera mounted to the body, and a computer system programmed to perform the following operations: (a) measuring star vectors on an imaging plane of the camera at a plurality of instants of time; (b) calculating respective spacecraft body rates for the instants of time based on the star vector measurements without using attitude information; (c) forward Kalman filtering the calculated spacecraft body rates; (d) backward Kalman filtering the calculated spacecraft body rates; (e) averaging the results of steps (c) and (d) to produce average rate estimates; (f) selecting one of the average rate estimates, or calculating a rate estimate that is a function of two or more of the average rate estimates; and (g) calculating a three-axis attitude of the spacecraft based on the rate estimate selected or calculated in step (f).

Yet another aspect is a method for calibrating a rate sensor comprising: acquiring measurements using a rate sensor and a star tracker running simultaneously; calculating rate sensor rates from measurements made by the rate sensor and star tracker rates from measurements made by the star tracker during the same time interval; filtering the calculated rate sensor rates forward and backward Kalman filtering and then averaging the filtered results; filtering the calculated star tracker rates forward and backward Kalman filtering and then averaging the filtered results; determining differences between the filtered rate sensor rates to the filtered star tracker rates; and calibrating the rate sensor to take the differences into account. In accordance with one embodiment, the rate sensor is a gyro, and the differences are indicative of gyro bias drift and noise.

Other aspects of systems and methods for gyroless attitude control of a spacecraft using a star tracker are disclosed and claimed below.

BRIEF DESCRIPTION OF THE DRAWINGS

Reference will hereinafter be made to the drawings in which similar elements in different drawings bear the same reference numerals.

DETAILED DESCRIPTION

Figure 1:
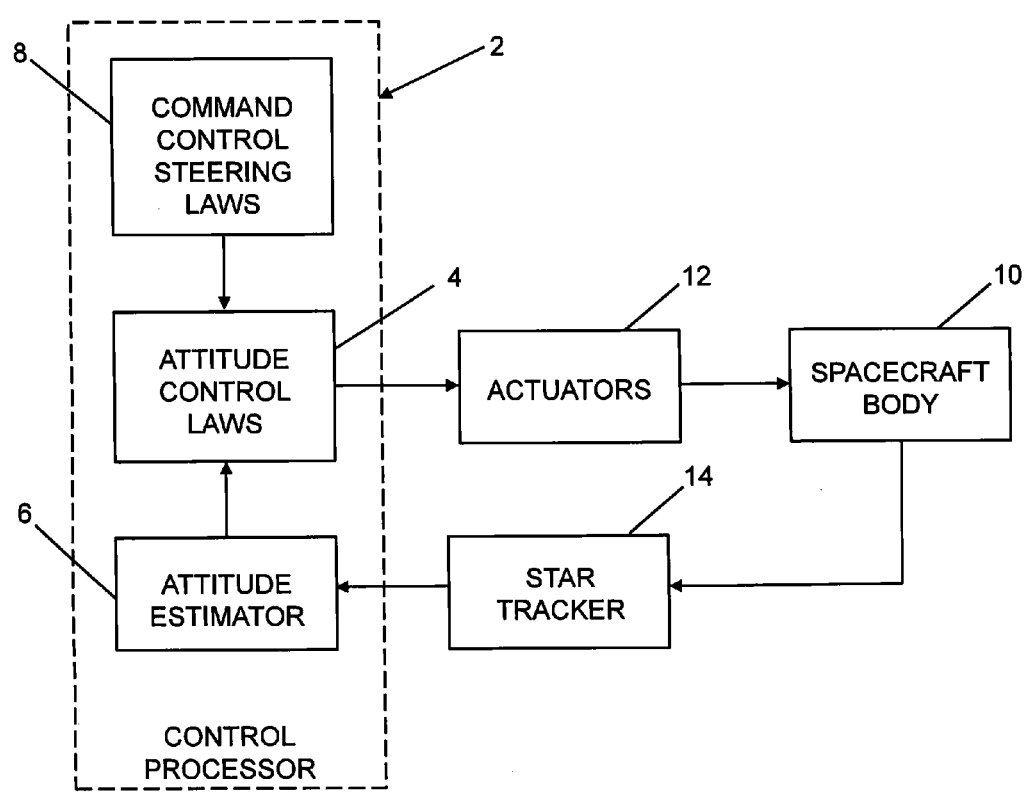
FIG. 1 is a block diagram showing some components of a spacecraft having an attitude control system which is programmed to re-orient a disoriented spacecraft using sun sensor measurements and an unscented Kalman filter.

The following detailed description is merely exemplary in nature and is not intended to limit coverage to the described embodiments or the disclosed applications and uses of the described embodiments. Furthermore, there is no intention to be bound by any particular theory expressed, implied or relied upon in the preceding background and summary or in the following detailed description.

It is common practice to derive the spacecraft rate using the kinematics equation and the attitude quaternion from the Earth-centered inertial (ECI) frame to the spacecraft body frame using Wahba solution methods, provided that the quaternion sampling rate is high enough to meet application requirements. Wahba's Problem seeks to find a rotation matrix between two coordinate systems from a set of (weighted) vector observations. More specifically, Wahba's Problem can be stated as follows: Given two sets of vectors, find the rotation M that brings the first set of vectors into the best least squares coincidence with the second set. Solutions to this problem can be used to estimate the attitude of a satellite by using vector representations of the objects (e.g., stars) in a satellite fixed frame of reference and vector representations of the same objects in a known frame of reference. The matrix M is then a least squares estimate of the rotation matrix which carries the known frame of reference into the satellite fixed frame of reference. Methods for solving the Wahba's Problem are disclosed in the following references (the contents of which are incorporated herein in their entireties): Wahba, G., "Problem 65-1, A Least Squares Estimate of Spacecraft Attitude", SIAM Review, Vol. 7, No. 3, July 1965, p. 409; Crassidis and Junkins, Optimal Estimation of Dynamical Systems, Chapman & Hall/CRC, Boca Raton, Fla., 2004; Crassidis et al., "Survey of Nonlinear Attitude Estimation Methods," J. of Guidance, Control and Dynamics, Vol. 30, No. 1, January-February, 2007, pp. 12-28; and Shuster and Oh, "Three-Axis Attitude Determination from Vector Observation," J. of Guidance and Control, Vol. 4, No. 1, January-February 1981, pp. 70-77.

Alternatively, spacecraft rates can be estimated directly from raw star vector measurements using an attitude-independent rate estimation algorithm. It requires more complicated algorithms to derive the rates from the raw star vector measurements directly without the need to identify the spacecraft attitude. Attitude-independent methods for star tracker rate estimation have been disclosed in Crassidis, "Angular Velocity Determination Directly from Star Tracker Measurements" AIAA Journal of Guidance, Control, and Dynamics, Vol. 25, No. 6, November-December 2002, pp. 1165-1168, and Singla et al., "Spacecraft Angular Rate Estimation Algorithms for Star Tracker-Based Attitude Determination", 13th AAS/AIAA Space Flight Mechanics Meeting, Ponce, Puerto Rico, February 2003, AAS Paper #03-191, the disclosures of which are incorporated by reference herein in their entireties.

This disclosure presents a system consisting of hardware which can be programmed with either or both of the following software packages: software for performing an attitude-dependent rate estimation algorithm using star tracker measurements; or software for performing an attitude-independent rate estimation algorithm using star tracker measurements. It is understood that other software packages are also resident on the attitude control processor, such as software for determining spacecraft attitude based on gyro measurements.

FIG. 1 shows some components of a spacecraft having an attitude control processor 2 that is programmed to re-orient a disoriented spacecraft using measurements acquired by a star tracker 14 mounted to the spacecraft body 10. The spacecraft body 10 can be rotated about three axes by means of a multiplicity of actuators 12. The actuators 12 can be either reaction wheels or thrusters, or both reaction wheels and thrusters can be used. Preferably the actuators 12 include respective sets of actuators for each axis of rotation.

The attitude control processor 4 is capable of executing attitude control operations in accordance with instructions stored in a plurality of flight software modules, including an attitude estimator 6, attitude control laws 4, and command control steering laws 8 referenced to an inertial frame with a fixed offset to an ECI frame of reference. The attitude control processor 2 applies the attitude control laws 4 based on the command control steering laws module 8 and attitude estimates from the attitude estimator 6, performing calculations to determine the appropriate commands to issue to the actuators 12. The attitude control laws 4 comprise algorithms to command the actuators 12 based on current attitude estimates from the attitude estimator 6 and a desired attitude specified by the command control steering laws 8. The attitude estimator 10 is programmed to compute spacecraft attitude and rate estimates based on measurements made by the star tracker 14 without any input from gyroscopes. A rate estimate is an estimate of the spacecraft roll, pitch and yaw body rates with respect to an inertial reference frame. A by-product of the rate estimate is an estimate of the attitude correction required to achieve the commanded attitude. The computations performed by attitude estimator 6 are disclosed in detail below.

In accordance with one embodiment of the system represented (on a high level) in FIG. 1, the attitude estimator estimates the spacecraft body angular velocity or rate by applying an attitude-dependent angular velocity estimation algorithm. Star positions are fixed with respect to the ECI coordinate frame, so spacecraft attitude can be determined by taking photographs of stars using a camera of a star tracker. The star tracker 14 comprises a camera and a processor programmed with software for processing images captured by the camera.

Figure 2:
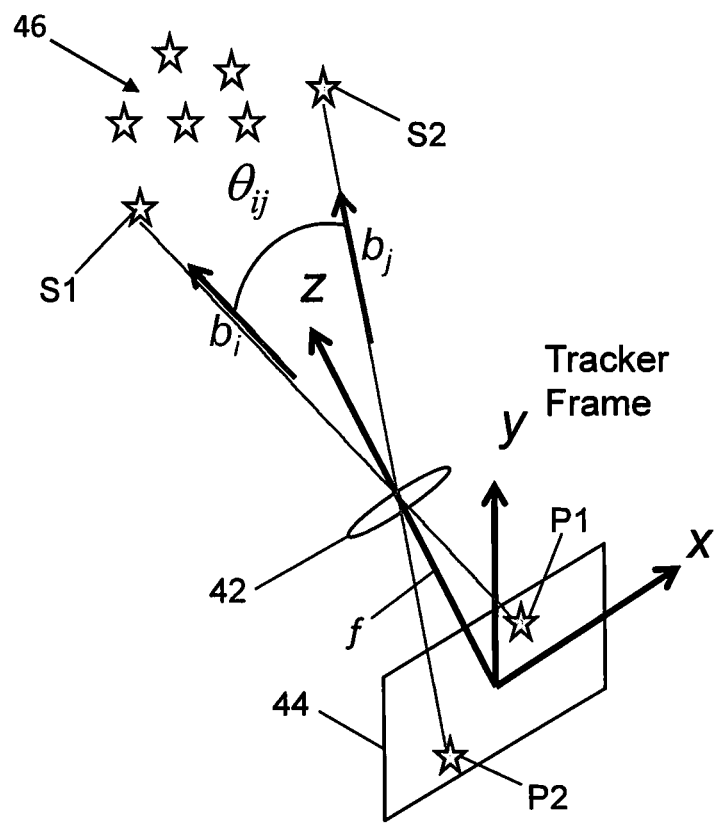
FIG. 2 is a diagram showing an image plane star pair in a star tracker model.

The processing of star images by such a star tracker is depicted on a high level in FIG. 2, which depicts a camera aperture 42, a camera image plane 44, and a multiplicity of stars 46. The star tracker (i.e., image) coordinate system is indicated by axes X, Y and Z, the Z axis being aligned with the boresight axis of the camera. The camera has a focal length $f$.
FIG. 2 shows a pair of star vectors $\vec{b}_i$ and $\vec{b}_j$ in the star tracker frame. These vectors are aligned with the respective lines along which the images of a pair of stars S1 and S2 are projected onto the image plane 44 at points P1 and P2 respectively. Each of star vectors $\vec{b}_i$ and $\vec{b}_j$ has a corresponding pair of H and V components (not shown in FIG. 2) in the image plane 44 of the star tracker. The H's and V's form vectors representing the positions of points P1 and P2 on the image plane relative to the origin of the star tracker frame.

Attitude-Dependent Spacecraft Angular Velocity Estimation

In the attitude-dependent rate estimation embodiment, the processor of the star tracker 14 registers the positions of multiple stars with respect to the camera's boresight and tracks or reports on the changing position of the tracked stars as they move through the field-of-view of the camera. The stars appear to move through the field-of-view of the camera because of movement of the spacecraft body 10; the stars are not moving, or are moving very slowly (on the order of up to a few arc-seconds per year) with respect to the an inertial reference frame. In particular, the star tracker processor acquires H and V vector measurements, which are output to the attitude estimator 6.

Figure 3:
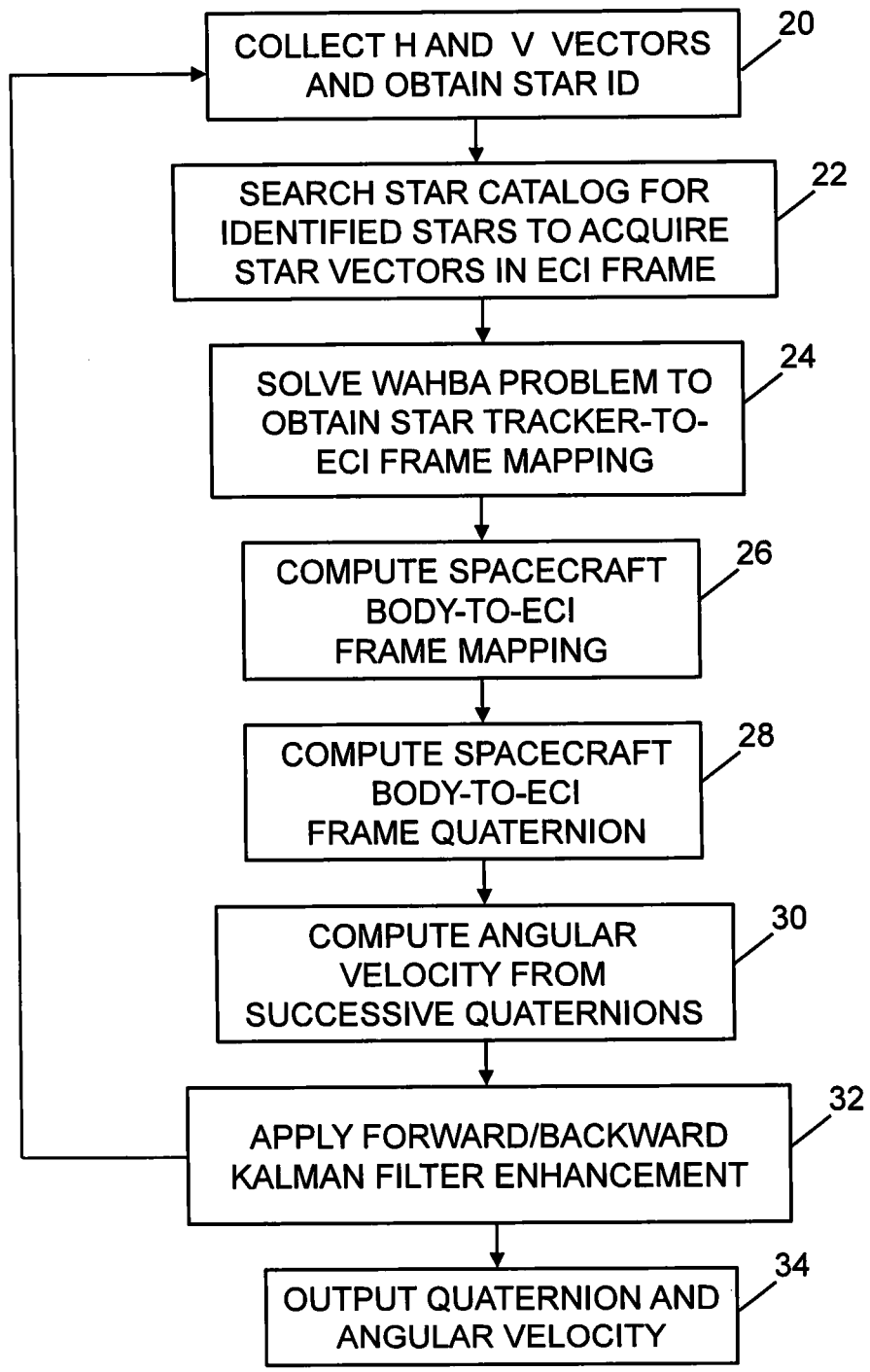
FIG. 3 is a flowchart showing steps of a method for attitude-dependent spacecraft body rate estimation using star tracker measurements.

Some of the steps of a method for attitude-dependent spacecraft body rate estimation using star tracker measurements are shown in FIG. 3. First, the star tracker collects the H and V vectors corresponding to star vectors $\vec{b}_i$ and $\vec{b}_j$ and the attitude estimator obtains star identification and position information from telemetry or from a star catalog stored in on-board computer memory (steps 20). The star catalog contains the spherical coordinate angles of the star to a high accuracy. Using the star catalog, the attitude estimator 6 performs a pattern match to identify which stars are being tracked. Numerous algorithms for star identification are known. The attitude estimator computes the star vectors in the ECI frame for the identified stars that match the same separation angles and brightness magnitudes listed in the star catalog (step 22). Once the star vectors have been acquired, the attitude estimator can use any one of various methods (see references cited above) to solve Wahba's Problem to obtain the Euler transformation $C_{ECI}^{st}$ (step 24), which represents the mapping of the star tracker frame to the ECI frame. The various methods for solving Wahba's problem include polar decomposition, Eigen structure, SVD, q-method, QUEST, FOAM, and/or TRIAD. Thereafter, the attitude estimator calculates the ATTITUDE COORDINATE TRANSFORMATION $C_{ECI}^{b} = C_{st}^{b} C_{ECI}^{st}$ (THE STAR TRACKER-TO-SPACECRAFT BODY mapping $C_{st}^{b}$, which is given by the spacecraft geometry, is read from computer memory) and then uses the transformation $C_{ECI}^{b}$ to estimate the quaternion $q_{ECI}^{b}$ (step 26). The quaternion $q_{ECI}^{b}$ is estimated at successive times $t_k$, $t_{k+1}$, etc. (step which enables the attitude estimator to also estimate the spacecraft body angular velocity $\bar{\omega}_k = 2(q_{ECI,k+1,k}^{b})^* \otimes \dot{q}_{ECI,k+1,k}^{b}$ (step 30) (the * symbol indicates the conjugate of the quaternion). These estimates are derived using a forward-propagating Kalman filter, as will be described in more detail below. In step 32, the estimated rates and error covariances are subjected to enhanced Kalman filtering comprising averaging of forward and rearward propagations of the Kalman filter states and the error covariances. The attitude control processor is then able to calculate an attitude correction $\Delta q_{\hat{b}}^{b} = \hat{q}_{\hat{b}}^{ECI}(\mathbf{x}) q_{ECI}^{b,cmd}$ (the hat symbol ^ indicates estimated), which is used to command the actuators to achieve the commanded attitude of the spacecraft body $q_{ECI}^{b,cmd}$.

It has been shown by Singla et al. (cited above) that a Kalman filter can be used to improve the raw derived rate. The Kalman filter used for this application is summarized as follows:

The state vector x of the Kalman filter comprises a three-component angular velocity $\omega$:

$$x = \begin{bmatrix} \delta q \\ \omega \end{bmatrix}$$

Assuming no rate information, the acceleration is simply $\dot{\omega} = \eta_2$ with Gaussian noise:

$$E(\eta_2)=0, E(\eta_2\eta_2^T)=\sigma_v^2 I$$

The state propagation (i.e., prediction) and update (i.e., correction) equations can be written as follows:

Prediction Equations:

$$\hat{q}_{k+1} = \left[\cos\left(\frac{\theta_k}{2}\right)I_{4\times 4} + \sin\left(\frac{\theta_k}{2}\right)\Omega(\hat{n}_k)\right]\hat{q}_k$$

where $$\theta_k = \omega_n * (t_{k+1} - t_k)$$

$$\omega_n = \|\hat{\omega}_k\|$$

$$= \sqrt{\hat{\omega}_{k1} + \hat{\omega}_{k2} + \hat{\omega}_{k3}}$$

$$P_{k+1} = \Phi_k P_k \Phi_k + G Q_k G$$

with $$\Phi_k = \begin{bmatrix} \Phi_{1k} & \Phi_{2k} \\ O_{3\times 3} & I_{3\times 3} \end{bmatrix}$$

$$\Phi_{1k} = I_{3\times 3} + \frac{\tilde{\omega}^T}{\omega_n}\sin\theta_k + \left(\frac{\tilde{\omega}^T}{\omega_n}\right)^2 (1-\cos\theta_k)$$

$$\Phi_{2k} = \frac{1}{2}\left[I_{3\times 3}\Delta t + \frac{\tilde{\omega}^T(1-\cos\theta_k)}{\omega_n^2} + \frac{\tilde{\omega}\tilde{\omega}(\theta_k - \sin\theta_k)}{\omega_n^3}\right]$$

Correction Equations:

$$\hat{x}_k^+ = \hat{x}_k^- + K_k(\tilde{y}_k - H_k\hat{x}_k^-)$$

$$P_k^+ = (I - K_k H_k) P_k^-$$

$$K_k = P_k^- H_k^T (H_k P_k^- H_k^T + R_k)^{-1}$$

where $$H_k = [L\, O_{3\times 3}]$$

$$L = 2[\hat{b}(\mathbf{x})]$$

$$\hat{b} = Cr + v$$

and $v$ is measurement noise with covariance:

$$R = \frac{\sigma^2}{\Delta t^2} I_{3\times 3}$$

In accordance with the attitude-dependent rate estimation methodology disclosed herein, the Kalman filtering described above is enhanced to improve the accuracy of the estimation errors. This enhanced Kalman filtering comprises taking an average of forward and rearward propagations of the Kalman filter states and error covariances. No new measurements are required.

The forward-propagating Kalman filter estimates a process state at some time and then obtains feedback in the form of noisy measurements. The propagation equations project the current state and error covariances forward in time to obtain a priori estimates for the next time step. The correction equations provide feedback by incorporating a new measurement into the a priori estimate to obtain an improved a posteriori estimate.

The accuracy of the above-described attitude-dependent rate estimation using Kalman filtering can be improved using enhanced Kalman filtering comprising the following steps: (1) inputting the measurements into the Kalman filter in the same time sequence in which the measurements were made (referred to hereinafter as "forward Kalman filtering"); (2) inputting the same measurements into the same Kalman filter in a time sequence which is the reverse of the same time sequence in which the measurements were made (referred to hereinafter as "backward Kalman filtering"); and (3) averaging the respective estimated state and error covariances output by the forward and backward Kalman filtering for each time step. The attitude estimator can process estimates for different parameters in parallel and then output the best estimate for each parameter for use by the attitude controller. For example, assume that H and V vector measurements are made at times $t_1, t_2, \ldots t_{10}$, and that corresponding rate estimates $\omega_1^f, \omega_2^f, \ldots, \omega_{10}^f$ are obtained by forward Kalman filtering. Then corresponding rate estimates $\omega_1^b, \omega_2^b, \ldots, \omega_{10}^b$ are obtained by backward Kalman filtering. The respective rate estimate pairs $\omega_k^f$ and $\omega_k^b$ are then averaged to obtain the average rate estimates $\omega_1^{avg}, \omega_2^{avg}, \ldots, \omega_{10}^{avg}$. The attitude estimator may then select one of the average rate estimates, or calculate a rate estimate that is a function of two or more of the average rate estimates, for use in attitude determination. The particular function used to select the best estimate may depend on many factors, including the properties of the Kalman filter being used. This process is repeated periodically to provide updated rate estimates to the attitude controller. This process can also be performed in parallel for other parameters, such as the spacecraft body frame-to-ECI frame quaternion.

Attitude-Independent Spacecraft Angular Velocity Estimation

As previously mentioned, Crassidis disclosed a method for determining spacecraft angular velocity directly from star tracker body measurements. This approach does not require star reference vector information or attitude information. Instead the Crassidis method is based on knowledge of the spacecraft body vector measurements obtained directly from the star tracker. The H and V vectors of the respective star vectors are derived by the star tracker. Using this technique, angular velocities can be determined in the event of star pattern recognition anomalies, which angular velocities can then be used to control the spacecraft in the event of gyro failures. The method for controlling the attitude and rate of the spacecraft body based in part on the estimated angular rate is similar to the attitude control method previously described with reference to FIG. 1.

Figure 4:
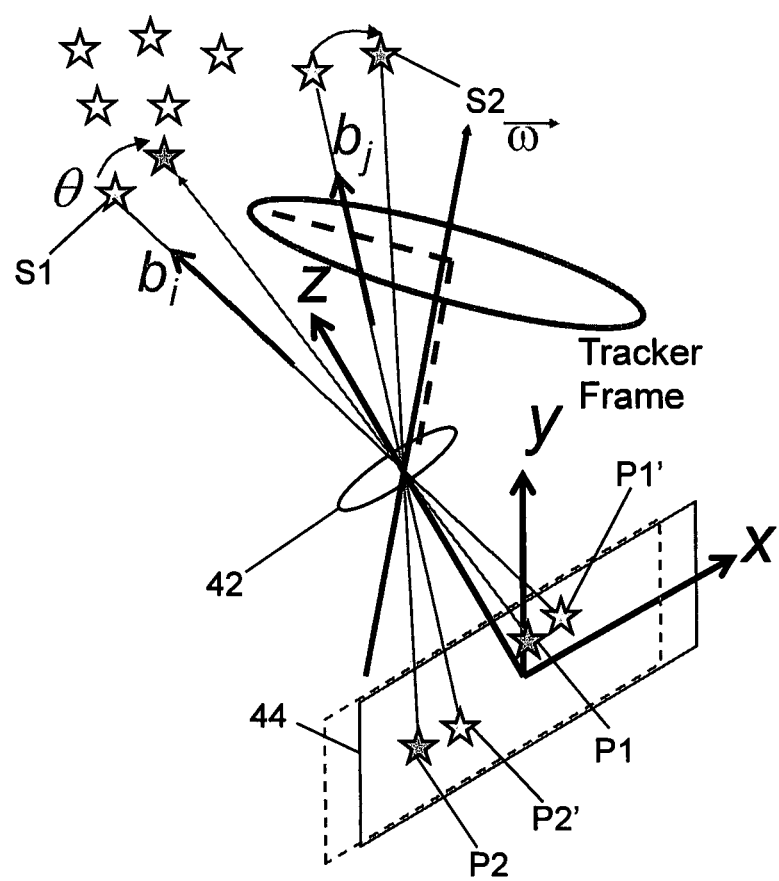
FIG. 4 is a diagram showing movement of an image plane star pair in a star tracker model that employs a star vector pair matching algorithm.

The attitude-independent methodology employs star vector pair matching algorithm. FIG. 4 is a diagram showing movement of star pair images projected onto the imaging plane of the star tracker camera. To calculate the angular velocity estimates, the star tracker must acquire the same star vectors at successive times $t_k$ and $t_{k+1}$. In FIG. 4, only the star vectors $\vec{b}_i$ and $\vec{b}_j$ acquired at time $t_k$ for stars S1 and S2 are shown. It is assumed that the body angular velocity $\omega$ is constant during the time interval from $t_k$ to $t_{k+1}$. At time $t_k$ the image of star S1 is projected onto the imaging plane at point P1, whereas at time $t_{k+1}$ the image of star S1 will be projected onto the imaging plane at point P1'. Similarly, at time $t_k$ the image of star S2 is projected onto the imaging plane at point P2, whereas at time $t_{k+1}$ the image of star S2 will be projected onto the imaging plane at point P2'. The difference between the star vectors at times $t_k$ and $t_{k+1}$ can be expressed as follows:

$$\tilde{b}_i(k+1) - \tilde{b}_i(k) = -\Delta t[\omega(k) \times] A(k) r_i + v_i(k+1) - v_i(k)$$

In order to successfully match the star vectors between sampled frames without star identification, the star vectors need to be paired correctly so that the rate can be derived accordingly. The following vector matching algorithm was developed to make the process robust.

Step 1: Use the previously computed/derived rate to rotate the star vectors into the next sampled-data frame.

Step 2: Compute the detection threshold from the predicted error bound described by Liebe et al. in the paper entitled "Toward a Stellar Gyroscope for Spacecraft Attitude Determination," J. of Guidance, Control and Dynamics, Vol. 27, No. 1, January-February, 2004, the disclosure of which is incorporated by reference herein in its entirety. (As used herein, the term "detection threshold" refers to the threshold used to binarize the star tracker camera pixel images, whereby all pixel values above the threshold are set to unity and all pixel values below the threshold are set to zero.) For the Kalman filter case, the propagated covariance matrix P is used.

Step 3: Pair the star vectors based on the separation angles and detection threshold computed in Step 2.

Using a least-squares approach, Crassidis derived a set of formulae to estimate the spacecraft rate from star tracker body measurements alone, i.e., without identifying spacecraft attitude and without using reference vectors. Crassidis disclosed three methods respectively referred to as: (1) first-order difference approximation; (2) central difference approximation; and (3) second-order difference approximation. The Crassidis formulae for these three approximation methods are summarized below:

1. First-Order Least Squares:

$$\hat{\omega}(k) = \frac{1}{\Delta t}\left\{\sum_{i=1}^{n}\overline{\sigma}_i^{-2}[\tilde{b}_i(k)\times]^T[\tilde{b}_i(k)\times]\right\}^{-1} \times \sum_{i=1}^{n}\overline{\sigma}_i^{-2}[\tilde{b}_i(k)\times]^T\tilde{b}_i(k+1)$$

where $\tilde{b}_i(k)$ is the i-th star vector; $\hat{\omega}(k)$, is the estimate of $\omega(k)$, and $\overline{\sigma}_i^2 \equiv 2\sigma_i^2/\Delta t^2$ is the effective measurement error variance. This approximation is only good for constant rate or when the bandwidth of the attitude variations is near the Nyquist frequency. Knowledge of the same-star measurements at times (k+1) and k is required to estimate the rate at time $_k$.

2. Central Difference:

$$\hat{\omega}(k) = \frac{1}{2\Delta t}\left\{\sum_{i=1}^{n}\overline{\sigma}_i^{-2}[\tilde{b}_i(k)\times]^T[\tilde{b}_i(k)\times]\right\}^{-1} \times$$

$$\sum_{i=1}^{n}\overline{\sigma}_i^{-2}[\tilde{b}_i(k)\times]^T[\tilde{b}_i(k+1) - \tilde{b}_i(k-1)]$$

This approximation is good for higher varying rates.

3. Second-Order Least Squares:

$$\hat{\omega}(k) = \frac{1}{2\Delta t}\left\{\sum_{i=1}^{n}\bar{\sigma}_i^{-2}[\tilde{b}_i(k)\times]^T[\tilde{b}_i(k)\times]\right\}^{-1} \times$$

$$\sum_{i=1}^{n}\bar{\sigma}_i^{-2}[\tilde{b}_i(k)\times]^T[\tilde{b}_i(4k+1)-\tilde{b}_i(k+2)]$$

This approximation is more accurate for higher rates at the price of larger estimation errors and more computations.

Singla et al. derived a Kalman filter specifically designed for use in determining the spacecraft body angular rate vector from star tracker body measurements as disclosed by Crassidis. The Kalman filter proposed by Singla et al. can be summarized as follows:

Digitize the position vector differential equation via a first-order Taylor series expansion:

$$\frac{db_i(t)}{dt} = -[\omega(t)\otimes]b_i(t) \Rightarrow b_i(k) = b_i(k-1) + \left.\frac{db_i(t)}{dt}\right|_{k-1}\Delta t + O(\Delta t^2)$$

Singla et al. disclosed the following equations to arrive at a new noise vector $w_i(k)$:

$$\tilde{b}_i(k) = b_i(k) + v$$

$$Y_i(k) = \frac{1}{\Delta t}[\tilde{b}_i(k) = \tilde{b}_i(k-1)]$$

$$= [\tilde{b}_i(k-1)\otimes]\omega(k-1) + w_i(k) + O(\Delta t)$$

$$w_i(k) = \frac{1}{\Delta t}[v_i(k) - v_i(k-1)] + [\omega(k-1)\otimes]v_i(k-1)$$

To improve the accuracy of spacecraft angular velocity estimates, the following higher-order finite difference approximation using Taylor series expansion was proposed:

$$Y_i(k) = \frac{1}{2\Delta t}[4\tilde{b}_i(k-1) - 3\tilde{b}_i(k-1) - \tilde{b}_i(k)]$$

$$= [\tilde{b}_i(k-1)\otimes]\omega(k-1) + w_i(k) + O(\Delta t^2)$$

where $$w_i(k) = [\tilde{b}_i(k-2)\otimes]v_i(k-2) + \frac{1}{2\Delta t}[4v_i(k-1) - 3v_i(k-2) - v_i(k)]$$

Define $$G = I_{3\times 3}$$

$$Q = \sigma^2 I_{3\times 3}\Delta t$$

$$R = \frac{\sigma^2 I_{3\times 3}}{\Delta t^2} \text{(Design Knob)}$$

$$Y_i(k) = \frac{1}{2\Delta t}[4\tilde{b}_i(k+1) - 3\tilde{b}_i(k) - \tilde{b}_i(k+2)]$$

$$H_k = [\tilde{b}_i(k)\otimes]$$

To take care of time-varying rates, the rate is modeled as first-order statistics (propagation of error covariance matrix P via the Riccati solution):

$$\dot{\omega} = \eta, E(\eta\eta^T) = \sigma^2 I$$

$$P_k^- = P_k^+ + GQG$$

The final update equations with Kalman gains are as follows:

$$\hat{x}_k^+ = \hat{x}_k^- + K_k(\tilde{y} - H_k\hat{x}_k^-) \text{(Rate Estimates)}$$

$$P_k^+ = (I - K_k H)P_k^-$$

$$K_k = P_k^- H_k^T(H_k P_k^- H_k^T + R_k)^{-1}$$

When tuning Kalman filter weightings Q and R, smaller Q means that there is less trust in the measurement. The resulting Kalman filter has a lower filter bandwidth with a large lag effect.

The performance of the foregoing Kalman filter can be further enhanced using averaging of forward and backward Kalman filtering results as described above. The major steps of an attitude-independent star tracker rate estimation method in accordance with one embodiment are shown in the flowchart of FIG. 5.

Figure 5:
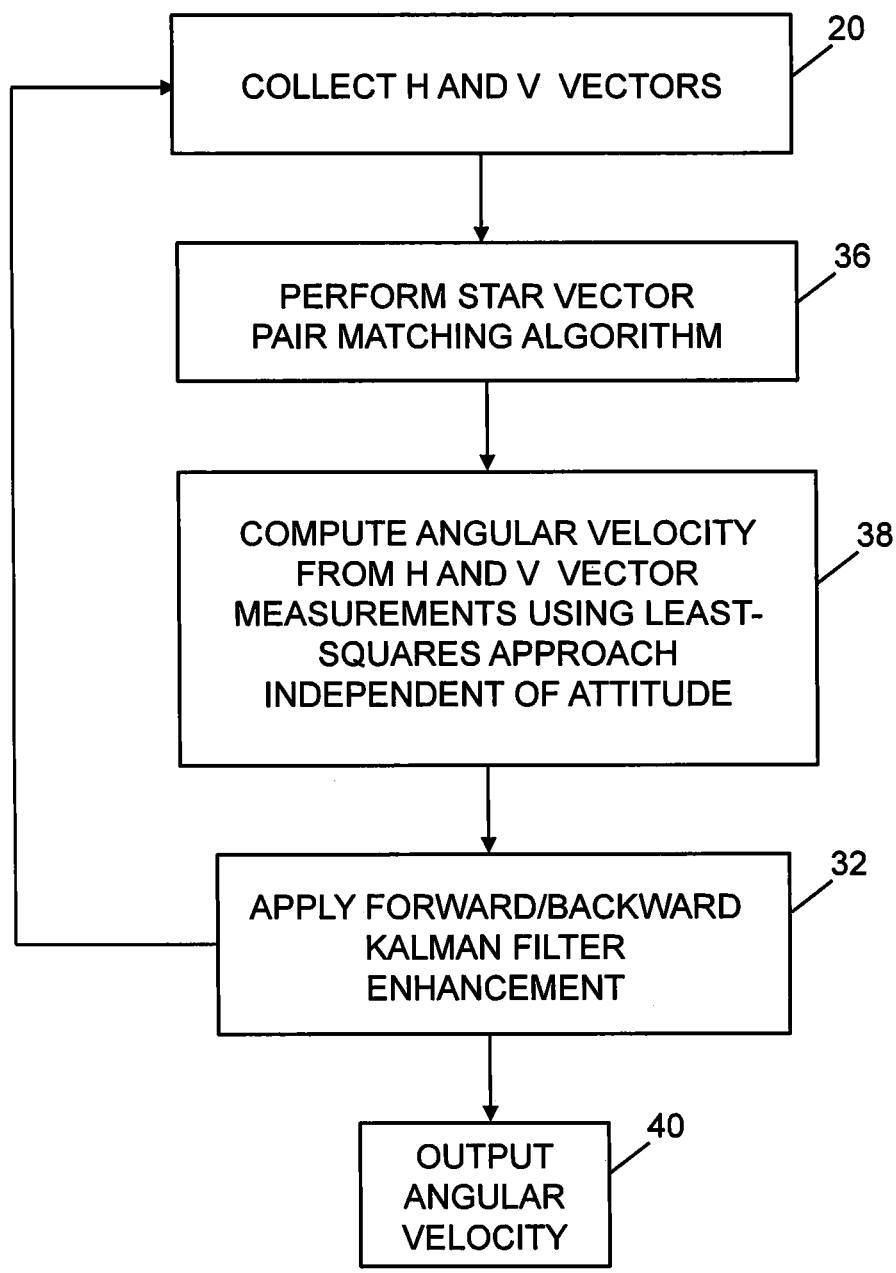
FIG. 5 is a flowchart showing steps of a method for attitude-independent spacecraft body rate estimation using star tracker measurements.

Referring to FIG. 5, first the star tracker collects the H and V vectors corresponding to star vectors $\vec{b}_i$, $\vec{b}_j$ (step 20). Then the attitude estimator performs the star vector pair matching algorithm (step 36). The attitude estimator then computes the angular velocity based on the H and V vector measurements using one of the difference approximations disclosed by Crassidis (step 38). These computations are performed without attitude information and without star identification. The results of the Crassidis computations are then processed using an enhanced Kalman filtering process based on the Kalman filter disclosed by Singla et al. (step 32). As previously described, the enhanced Kalman filtering comprises taking an average of forward and rearward propagations of the Singla et al. Kalman filter states and error covariances. For each set of averaged estimates, the attitude estimator will select a best estimate, which is output to the attitude controller for use in controlling the spacecraft attitude.

The efficiency and effectiveness of a set of rate estimate algorithms using star tracker measurements and enhanced Kalman filtering were demonstrated by means of computer simulations. The work of Crassidis and Singla et al. was verified with independently developed computer-aided tools applied to various challenging numerical examples. Even though the numerical examples were artificial, they demonstrated the power of the rate estimate methods/algorithms disclosed by Crassidis and Singla et al.

Computer simulations were run to compare the enhanced Kalman filtering disclosed herein to forward Kalman filtering alone, backward Kalman filtering alone, and a smoothing algorithm that derives a posteriori estimates and covariances up to a time $t_m$ using forward Kalman filtering, derives a priori estimates and covariances back to time $t_m$ using backward Kalman filtering, and then combines both to get the final estimate and covariance at time $t_m$. Those computer simulations confirmed that the Kalman filter enhancement disclosed herein can reduce errors by a factor of 3 to 5. The results of these computer simulations are reported in detail in a published paper Chiang et al., "Star Tracker Rate Estimation with Kalman Filter Enhancement", AIAA Guidance, Navigation, and Control (GNC) Conference, Aug. 19-22, 2013, Boston, Mass., and in U.S. Provisional Application No. 61/765,586, the contents of both of which are incorporated by reference herein in their entireties.

Spacecraft three-axis angular rate information is needed for the control of the spacecraft orientation and attitude. Embodiments have been disclosed herein which use a star tracker and enhanced Kalman filtering to generate the needed three-axis rate information without the need for a gyroscope. The enhanced Kalman filtering disclosed herein also has application in calibrating other sensors, such as gyros.

Figure 6:
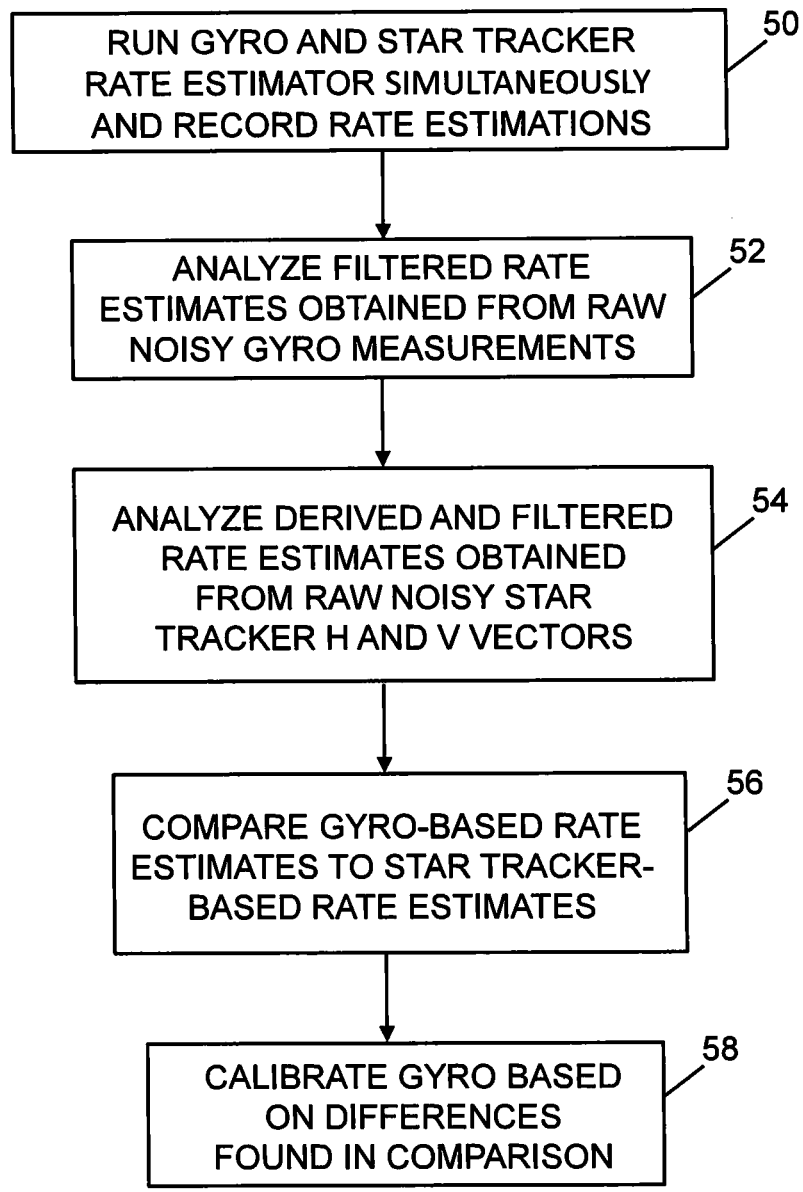
FIG. 6 is a flowchart showing steps of a gyro calibration procedure.

In accordance with one embodiment a gyro calibration procedure depicted on a high level in FIG. 6, a gyro calibration procedure may comprise the following steps:

(1) Run the gyro and star tracker rate estimator simultaneously for one hour and record the rate estimations from the "estimator" (step 50).

(2) Analyze the filtered rate information estimates which result when the raw noisy gyro measurements are processed using regular Kalman filter, smoother, averaged algorithms (coded in the attitude estimator) (step 52).

(3) Analyze the derived and filtered rate information estimates which result when the raw noisy star tracker H, V vectors are processed using the Kalman filter, smoother, averaged algorithms (coded in the attitude estimator) presented in this disclosure (step 54).

(4) Compare the spacecraft rate estimates filtered from the gyro measurements to the spacecraft rate estimates derived/filtered from the star tracker measurements (step 56).

(5) The difference determined in step 56 is the large gyro bias drift and noise, which can be used to calibrate the gyro (remove the bias and noise from the gyro estimate) for a more accurate rate estimate (step 58).

While exemplary embodiments have been disclosed herein, it should be appreciated that many variations are possible. It should also be appreciated that these exemplary embodiments are only examples, and are not intended to limit the scope, applicability, or configuration of the teachings herein in any way. Rather, the foregoing detailed description will provide those skilled in the art with a convenient road map for implementing various embodiments. Also it should be understood that various changes can be made in the functions and arrangements of elements disclosed herein without departing from the scope as set forth in the appended claims and the legal equivalents thereof.

As used in the claims, the term "computer system" should be construed broadly to encompass a system having at least one computer or processor, and which may have multiple computers or processors that communicate through a network or bus. As used in the preceding sentence, the terms "computer" and "processor" both refer to devices having a processing unit (e.g., a central processing unit) and some form of memory (i.e., computer-readable medium) for storing a program which is readable by the processing unit.

The method claims set forth hereinafter should not be construed to require that the steps recited therein be performed in alphabetical order or in the order in which they are recited. Nor should they be construed to exclude any portions of two or more steps being performed concurrently or alternatingly.

The invention claimed is:

1. A method of estimating a three-axis attitude and rate of a spacecraft in a spacecraft body frame of reference, comprising:

(a) measuring star vectors at a plurality of instants of time using a star tracker attached to a spacecraft;
(b) calculating a respective spacecraft body frame-to-ECI frame quaternion for each instant of time based on information derived from said measured star vectors;
(c) calculating spacecraft body rates based on the quaternions calculated in step (b);
(d) forward Kalman filtering the calculated spacecraft body rates;
(e) backward Kalman filtering the calculated spacecraft body rates;
(f) averaging the results of steps (d) and (e) to produce average rate estimates;
(g) selecting one of the average rate estimates, or calculating a rate estimate that is a function of two or more of the average rate estimates; and
(h) calculating a three-axis attitude of the spacecraft based on the rate estimate selected or calculated in step (g).

2. The method as recited in claim 1, further comprising commanding a change in spacecraft attitude and rate based on differences between a target three-axis attitude/rate and said calculated three-axis attitude/rate.

3. The method as recited in claim 1, further comprising calculating changes in attitude and rate based on the quaternions calculated in step (b).

4. The method as recited in claim 1, further comprising:
identifying star vectors in an ECI frame corresponding to said measured star vectors;
determining a first rotation matrix representing a mapping of a star tracker frame to the ECI frame;
retrieving a second rotation matrix representing a mapping of a spacecraft body frame to the star tracker frame; and
calculating a third rotation matrix representing a mapping of the spacecraft body frame to the ECI frame,
wherein said information derived from said measured star vectors comprises said third rotation matrix.

5. A spacecraft comprising a body, a camera mounted to said body, and a computer system programmed to perform the following operations:

(a) processing images of stars captured at successive instants of time by said camera to collect star vectors;
(b) calculating a respective spacecraft body frame-to-ECI frame quaternion for each instant of time based on information derived from said star vectors;
(c) calculating spacecraft body rates based on the quaternions calculated in operation (b);
(d) forward Kalman filtering the calculated spacecraft body rates;
(e) backward Kalman filtering the calculated spacecraft body rates;
(f) averaging the results of operations (d) and (e) to produce average rate estimates;
(g) selecting one of the average rate estimates, or calculating a rate estimate that is a function of two or more of the average rate estimates; and
(h) calculating a three-axis attitude of the spacecraft based on the rate estimate selected or calculated in operation (g).

6. The spacecraft as recited in claim 5, wherein said computer system is further programmed to command a change in spacecraft attitude based on differences between a target three-axis attitude and said calculated three-axis attitude.

7. The spacecraft as recited in claim 6, further comprising means for producing torques that change the attitude of the spacecraft in response to a command from said computer system.

8. The spacecraft as recited in claim 5, wherein said computer system is further programmed to calculate changes in attitude based on the quaternions calculated in operation (b).

9. The spacecraft as recited in claim 5, wherein said computer system is further programmed to perform the following operations:
identifying star vectors in an ECI frame corresponding to said measured star vectors;
determining a first rotation matrix representing a mapping of a star tracker frame to the ECI frame;
retrieving a second rotation matrix representing a mapping of a spacecraft body frame to the star tracker frame; and
calculating a third rotation matrix representing a mapping of the spacecraft body frame to the ECI frame,
wherein said information derived from said measured star vectors comprises said third rotation matrix.

10. A method of estimating a three-axis attitude and rate of a spacecraft in a spacecraft body frame of reference, comprising:
(a) measuring star vectors on an imaging plane at a plurality of instants of time using a star tracker attached to a spacecraft;
(b) calculating respective spacecraft body rates for said instants of time based on the star vector measurements without using attitude information;
(c) forward Kalman filtering the calculated spacecraft body rates;
(d) backward Kalman filtering the calculated spacecraft body rates;
(e) averaging the results of steps (c) and (d) to produce average rate estimates;
(f) selecting one of the average rate estimates, or calculating a rate estimate that is a function of two or more of the average rate estimates; and
(g) calculating a three-axis attitude of the spacecraft based on the rate estimate selected or calculated in step (f).

11. The method as recited in claim 10, further comprising commanding a change in spacecraft attitude based on differences between a target three-axis attitude and said calculated three-axis attitude.

12. The method as recited in claim 10, further comprising matching pairs of star vectors between sampled frames without identifying stars.

13. The method as recited in claim 12, wherein the star vector pair matching step comprises:
(h) measuring the positions of star vectors in a first sampled-data frame;
(i) predicting the positions of the same star vectors in a second sampled-data frame by rotating the measured star vectors at a rate equal to the rate estimate selected or calculated in step (f);
(j) computing a detection threshold using a covariance matrix;
(k) measuring the positions of star vectors in the second sampled-data frame; and
(l) pairing the star vectors whose positions were measured in step (k) with the star vectors having predicted positions based on separation angles and the detection threshold computed in step (j).

14. A spacecraft comprising a body, a camera mounted to said body, and a computer system programmed to perform the following operations:
(a) measuring star vectors on an imaging plane of the camera at a plurality of instants of time;
(b) calculating respective spacecraft body rates for said instants of time based on the star vector measurements without using attitude information;
(c) forward Kalman filtering the calculated spacecraft body rates;
(d) backward Kalman filtering the calculated spacecraft body rates;
(e) averaging the results of steps (c) and (d) to produce average rate estimates;
(f) selecting one of the average rate estimates, or calculating a rate estimate that is a function of two or more of the average rate estimates; and
(g) calculating a three-axis attitude of the spacecraft based on the rate estimate selected or calculated in step (f).

15. The spacecraft as recited in claim 14, wherein said computer system is further programmed to command a change in spacecraft attitude based on differences between a target three-axis attitude and said calculated three-axis attitude.

16. The spacecraft as recited in claim 15, further comprising means for producing torques that change the attitude of the spacecraft in response to a command from said computer system.

17. The spacecraft as recited in claim 14, wherein said computer system is further programmed to match pairs of star vectors between sampled frames without identifying stars.

18. The spacecraft as recited in claim 17, wherein the star vector pair matching operation comprises:
(h) measuring the positions of star vectors in a first sampled-data frame;
(i) predicting the positions of the same star vectors in a second sampled-data frame by rotating the measured star vectors at a rate equal to the rate estimate selected or calculated in operation (f);
(j) computing a detection threshold using a covariance matrix;
(k) measuring the positions of star vectors in the second sampled-data frame; and
(l) pairing the star vectors whose positions were measured in operation (k) with the star vectors having predicted positions based on separation angles and the detection threshold computed in operation (j).

19. A method for calibrating a rate sensor comprising:
acquiring measurements using a rate sensor and a star tracker running simultaneously;
calculating rate sensor rates from measurements made by the rate sensor and star tracker rates from measurements made by the star tracker during the same time interval;
filtering the calculated rate sensor rates forward and backward Kalman filtering and then averaging the filtered results;
filtering the calculated star tracker rates forward and backward Kalman filtering and then averaging the filtered results;
determining differences between the filtered rate sensor rates to the filtered star tracker rates; and
calibrating the rate sensor to take the differences into account.

20. The method as recited in claim 19, wherein said rate sensor is a gyro, and said differences are indicative of gyro bias drift and noise.

* * * * *